T. H. BARNES.
MILK BUCKET.
APPLICATION FILED MAY 9, 1910.

983,473.

Patented Feb. 7, 1911.

Witnesses

Inventor
Thomas H. Barnes
By E. E. Vrooman,
Attorney.

UNITED STATES PATENT OFFICE.

THOMAS H. BARNES, OF CRAWFORDSVILLE, IOWA.

MILK-BUCKET.

983,473.   Specification of Letters Patent.   Patented Feb. 7, 1911.

Application filed May 9, 1910. Serial No. 560,310.

*To all whom it may concern:*

Be it known that I, THOMAS H. BARNES, a citizen of the United States of America, residing at Crawfordsville, in the county of Washington and State of Iowa, have invented certain new and useful Improvements in Milk-Buckets, of which the following is a specification, reference being had therein to the accompanying drawing.

This invention relates to devices adapted to be detachably secured to a milk pail for the purpose of covering and protecting the bottom of the pail from becoming wet and soiled when resting on the ground during the operation of milking.

The invention has for its object to provide an improved device of this character which can be readily and quickly attached to and detached from the milk pail, and will effectively protect the bottom thereof from becoming soiled.

Figure 1:
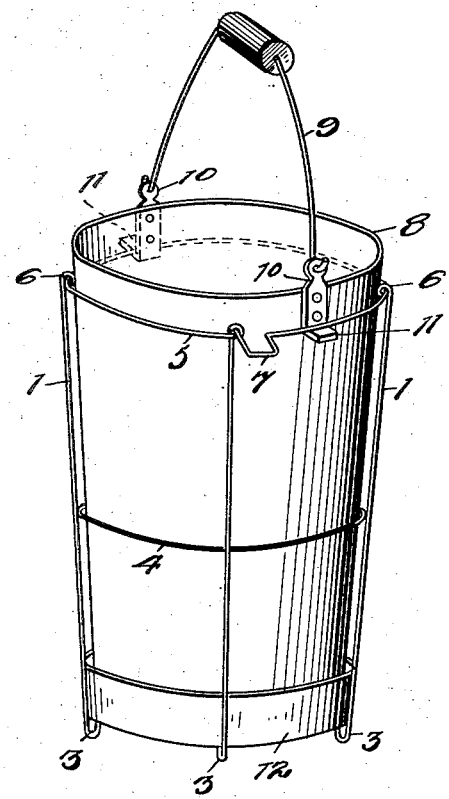
Figure 2:
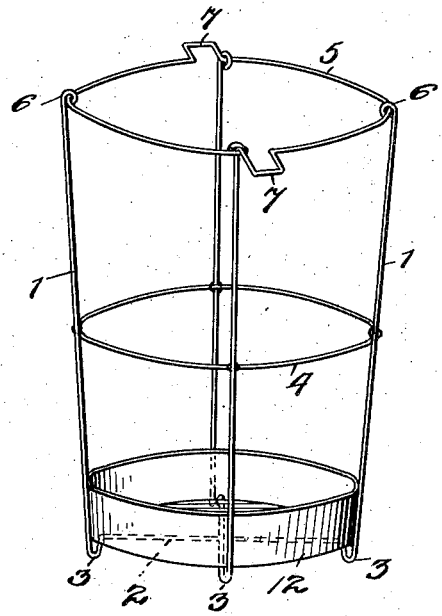
Figure 4:
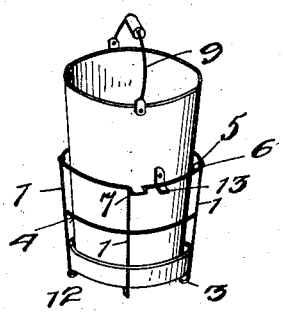
Figure 3:
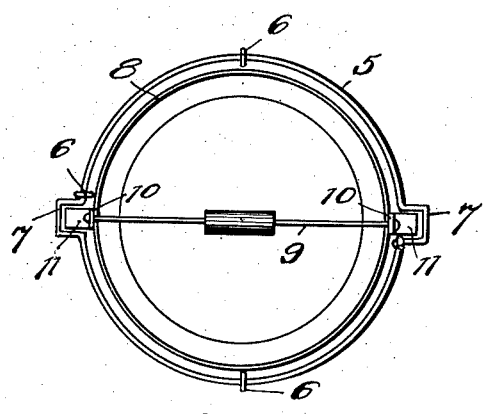

Referring to the accompanying drawings: Figure 1 is a side view in elevation of a milk pail with a detachable protecting device constructed in accordance with this invention applied thereto. Fig. 2 is a perspective view in elevation of the pail-protecting device detached from the pail. Fig. 3 is a plan view of the device shown in Fig. 1. Fig. 4 is a detail view in perspective of a modification of the invention.

The protecting device to be attached to a milk pail consists of a wire frame formed of lengths of wire bent to form vertical upright portions 1, and transverse cross portions 2, there being a pair of these wires having their transverse portions 2 crossing each other, as shown in dotted lines in Fig. 2. The lower portions of the wires are preferably bent into a folded projection 3, so as to afford standards or feet to rest on the ground. The uprights 1 are braced by means of a wire ring 4 secured thereto by soldering or otherwise, and the upper ends of the uprights 1 are secured to a ring 5 by being bent over the same, as at 6. The ring 5 is bent on opposite sides into laterally-extending U-shaped projections 7. A milk pail 8, having a bail 9 hinged to ears 10 on the pail, and having lateral projections 11, is inserted in the wire frame. The lateral projections 11 of the ears being movable through the U-shaped projections 7, of the ring 5. In order to protect the bottom of the milk pail located in the wire frame, a metallic dish or pan 12 is located in the bottom of the wire frame and rests on the cross wires 2, being elevated from the ground by the folded projections 3. In order to lock the milk pail in the wire frame, after the lateral projections 11 of the ears 10 have passed through the U-shaped lateral projections 7, the pail is turned so as to bring the lateral projections 11 beneath the wire ring 5 to the position shown in Fig. 1.

It will be seen that by means of this invention, as hereinbefore described, a simple, effective and light portable device is provided which can be easily and readily attached to and detached from a milk pail. The dish or pan 12, which detachably rests on the bottom of the wire frame may be readily removed for cleaning or other purposes. By means of this device the bottom of a milk pail will be kept clean and protected during the operation of milking.

While I have described a specific form of wire frame and specific means for detachably securing and locking said frame to a milk pail, I do not desire to confine myself thereto, as such construction may be variously modified without departing from the spirit of my invention.

In the modification shown in Fig. 4, the wire frame extends only over the lower half of the bucket or pail, and in lieu of the lateral projections 11 of the ears 10 of the pail, I provide the pail with lateral projections 13 secured thereto in any suitable manner and adapted to pass through the U-shaped lateral projections 7, and by turning the pail be brought beneath the wire ring 5.

Having described the invention, I claim:

1. In a device of the character described, a wire frame adapted to fit over a milk pail and consisting of wires bent to form a ring at the top, a ring at the center, vertical wires secured to said rings and bent to form bottom cross portions, and a pan mounted in the bottom of said wire frame.

2. In a device of the character described, a wire frame adapted to fit over a milk pail and formed of wires consisting of vertical portions and bottom transverse portions with depending folded projections, wire rings connecting said vertical portions, and a detachable pan resting on the bottom transverse portions of said wires.

3. In a device of the character described, the combination with a milk pail having lateral projections on its sides of a wire frame adapted to fit over said pail and to detachably engage and be locked with said lateral projections, and a pan mounted in the lower end of said wire frame in which said milk pail rests.

4. In a device of the character described, a milk pail having each of its bails formed with lateral projections, a wire frame adapted to fit over said milk pail and consisting of vertical wires bent at their lower ends and connected together to form transverse cross pieces, a wire ring connecting said vertical wires, a ring at the upper end of said vertical wires and connected thereto, and having oppositely located outwardly projecting U-shaped portions adapted to fit over said lateral projections on the bails, and a pan mounted on the transverse cross pieces of said wires the bottom of said pail being seated in said pan.

In testimony whereof I hereunto affix my signature in presence of two witnesses.

THOMAS H. BARNES.

Witnesses:
  GUY E. MANATT,
  JAMES L. BROOKHART.